Patented May 28, 1929.

1,715,217

UNITED STATES PATENT OFFICE.

DONALD E. WOODS AND EARL J. NEEL, OF BORGER, TEXAS, ASSIGNORS TO OIL-O-TREAT COMPANY, A CORPORATION OF TEXAS.

TREATMENT OF CRUDE PETROLEUM OIL.

No Drawing. Application filed March 9, 1928. Serial No. 260,543.

Our invention relates to the treatment of crude petroleum oil to cleanse and purify it and rid it of impurities. In many instances, crude petroleum oil as it comes from the well contains salt water and other impurities which are held under gas pressure in the well. Attempts have been made to clarify such oil from the impurities which will not settle out without treatment.

We have discovered a composition which is soluble in water and which, when thoroughly mixed with the oil to be treated, combines with the impurities and will precipitate as sludge and may be drawn off from the bottom of the container for the oil being treated.

Such compounds are on the market and our discovery consists of a new composition for this purpose. This composition is thoroughly stirred or mixed with the crude oil and allowed to settle, thus allowing the mixture with the impurities to be drawn off from the bottom of the treating vessel. In this way the oil may be clarified and purified and brought into proper condition for feeding to the pipe lines.

Our preferred formula is:—

| | Per cent. |
|---|---|
| Gas oil | 68 |
| Sulphuric acid | 10 |
| A fatty oil (preferably that known as redoil) | 14 |
| Crude phenol | 8 |

The above materials are thoroughly mixed and compounded by agitation and may be introduced into the oil in any desirable way, such as by lubrication or the dump method. The amount of the mixture to be used in any given case will depend upon the nature of the oil to be treated. In the case of ordinary Texas crude oil from the Hutchinson County field in Texas, we use about 25 gallons of our compound to about 100,000 gallons of the crude oil.

The advantages of our invention result from the purifying of the crude oil by our new composition; since the oil is thus easily and cheaply brought into proper condition for piping or transportation.

Other of the heavier petroleum fractions may be used instead of gas oil, and other fatty oils may be used instead of redoil.

We claim:

1. As a new composition matter for treating crude oils consisting of a heavy oil, sulphuric acid, a fatty oil and phenol, substantially as described.

2. As a new composition matter for treating crude oils, a heavy petroleum fraction, sulphuric acid, redoil, and crude phenol, substantially as described.

3. As a new composition matter for treating crude oils, a compound containing as a major constituent, a heavy petroleum fraction, sulphuric acid, a fatty oil and crude phenol, substantially as described.

4. As a new composition matter for treating crude petroleum oils, a heavy petroleum fraction about 68%, sulphuric acid about 10%, a fatty oil about 14% and crude phenol about 8%, substantially as described.

In testimony whereof we have hereunto set our hands.

DONALD E. WOODS.
EARL J. NEEL.